J. R. FLETCHER.
DOOR HINGE.
APPLICATION FILED DEC. 23, 1910.
1,027,716.
Patented May 28, 1912.
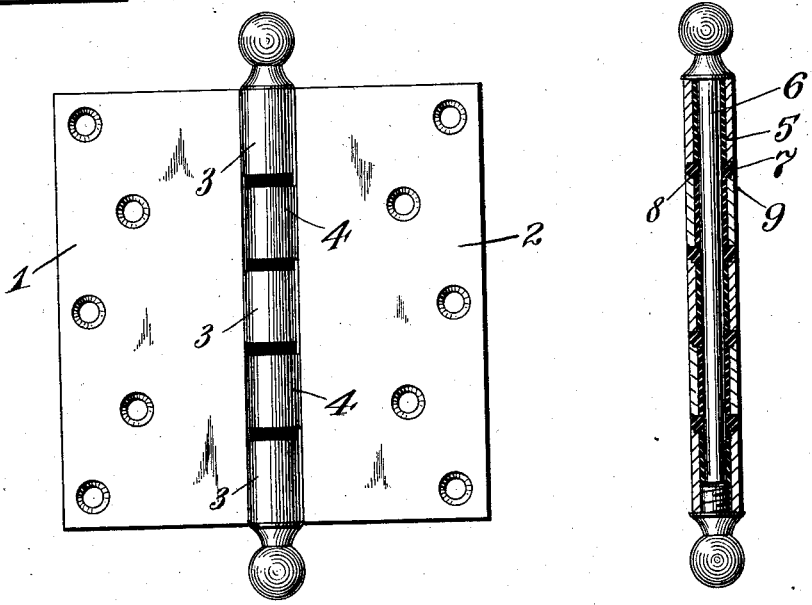

UNITED STATES PATENT OFFICE.

JAMES R. FLETCHER, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DOOR-HINGE.

1,027,716.   Specification of Letters Patent.   Patented May 28, 1912.

Application filed December 23, 1910. Serial No. 598,995.

*To all whom it may concern:*

Be it known that I, JAMES R. FLETCHER, a citizen of the United States, residing at New Britain, Hartford county, State of Connecticut, have invented certain new and useful Improvements in Door-Hinges, of which the following is a full, clear, and exact description.

My invention relates to improvements in hinges, and the object thereof is to provide means to prevent, to as great an extent as possible, the wear between adjacent knuckles of the hinge, and to render the relative movement of the knuckles noiseless.

A further object is to provide bearings within the hinge knuckles for the hinge pintle which shall likewise reduce the wear and further render the hinge noiseless.

With these objects in view, the invention consists in constructions and arrangements of parts, preferred embodiments of which are illustrated in the accompanying drawings, in which—

Figure 1 is a face view of a hinge embodying my improvements. Fig. 2 is a sectional view on the line 2—2 Fig. 1, the leaves of the hinge being closed.

In the embodiment of my invention illustrated in Figs. 1 and 2, 1—2 indicate the leaves of a hinge, the first having the knuckles 3—3—3 which coöperate with the knuckles 4—4—4 of the leaf 2. Each of the knuckles is provided with a bushing 5, preferably of wood fiber or other suitable fibrous material having wear resisting qualities, which forms bearings for the pintle 6. Between adjacent hinge knuckles is interposed a washer 7, also preferably of fibrous material, having a shoulder 8 which fits within an annular recess formed preferably at the upper end of each of the knuckles below the first. The bushings 5 serve as anti-friction and sound deadening bearings for the pintle, and the washers 7 perform like functions between the adjacent knuckles. The shouldered portions 8 of the washers, lying within the recesses 9 in the knuckles, not only afford a lengthened bearing for the pintle in the washers, but also maintain said washers properly centered with respect to the pintle and knuckles.

In the modified form of the invention illustrated in Figs. 3 and 4, the hinge leaves 10 and 11 may be in all respects similar to those shown in Fig. 1, the knuckles 12 of one leaf, however, forming with the knuckles 13 of the other a substantially continuous bearing for the hinge pintle 14. Bushings 15, similar to those heretofore described, are provided for each of the knuckles, and at the lower end of each knuckle is provided a fibrous washer 16 located in a recess 17 which bears upon a metal washer 18, preferably of steel, seated in a suitable recess in the upper end of the adjacent knuckle whereby anti-friction and noiseless bearing is afforded between the adjacent knuckles.

While I have herein shown and described a particular construction and arrangement of parts and have specified certain materials, it is to be understood that my invention may be altered in detail and arrangement of parts and as to selection of materials within the scope of the appended claim.

What I claim is:

A hinge embodying a plurality of knuckles, one of two adjacent knuckle ends having a recess therein, and a washer of fibrous material having a portion seated in said recess and having a flange extending therefrom and separating said adjacent knuckle ends, said washer forming an anti-friction and sound-deadening bearing surface between adjacent knuckles.

JAMES R. FLETCHER.

Witnesses:
A. N. ABBE,
WM. V. COLLINS.